(12) United States Patent
Weiss et al.

(10) Patent No.: US 11,098,800 B2
(45) Date of Patent: Aug. 24, 2021

(54) JOINED CONNECTION ON A TWO-PART PISTON AND JOINING METHOD

(71) Applicant: KS Kolbenschmidt GmbH, Neckarsulm (DE)

(72) Inventors: Eberhard Weiss, Langenbrettach (DE); Emmerich Ottliczky, Forchtenberg (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 0 days.

(21) Appl. No.: 15/802,739

(22) Filed: Nov. 3, 2017

(65) Prior Publication Data

US 2018/0051805 A1 Feb. 22, 2018

Related U.S. Application Data

(63) Continuation of application No. 14/422,852, filed as application No. PCT/EP2013/067559 on Aug. 23, 2013, now abandoned.

(30) Foreign Application Priority Data

Aug. 23, 2012 (DE) .......................... 102012215043.9

(51) Int. Cl.
*F16J 1/00* (2006.01)
*F02F 3/00* (2006.01)
*F02F 3/22* (2006.01)
*F16J 1/01* (2006.01)

(52) U.S. Cl.
CPC ............... *F16J 1/005* (2013.01); *F02F 3/003* (2013.01); *F02F 3/22* (2013.01); *F16J 1/01* (2013.01)

(58) Field of Classification Search
CPC ....... Y10T 29/49252; F02F 3/003; F02F 3/22; B23P 15/10; B23K 2201/003; F16J 1/005
See application file for complete search history.

(56) References Cited

U.S. PATENT DOCUMENTS 8,991,046 B2 * 3/2015 Schulz .................... F02F 3/003
29/888.042
2007/0295299 A1 * 12/2007 Lapp .................... F02F 3/0023
123/193.6

FOREIGN PATENT DOCUMENTS

| DE | 123962 | 1/1977 |
|---|---|---|
| DE | 102007005268 A1 | 8/2007 |
| DE | 102007036236 | 2/2009 |
| DE | 102007044106 A1 | 3/2009 |

(Continued)

OTHER PUBLICATIONS

International Search Report dated Oct. 22, 2013 for PCT/EP2013/067559.

*Primary Examiner* — Abiy Teka
(74) *Attorney, Agent, or Firm* — Young Basile Hanlon & MacFarlane, P.C.

(57) ABSTRACT

A piston, in particular, a gallery-cooled piston for an internal combustion engine has a piston bottom part and a piston upper part which are connected in a joining process to produce the piston. The piston upper part has at least one ring zone and an inner wall. The piston bottom part has a radially circumferential oblique surface at the end which faces the piston upper part. The oblique surface, interacting with the inner wall of the piston upper part, brings about a centering action during the joining process of the piston parts. A joining method for manufacturing a piston is also disclosed.

12 Claims, 7 Drawing Sheets

(56) References Cited

FOREIGN PATENT DOCUMENTS

DE 102010056220 A1 6/2012
FR 1451838 A 1/1966

* cited by examiner

JOINED CONNECTION ON A TWO-PART PISTON AND JOINING METHOD

CROSS-REFERENCE TO RELATED APPLICATIONS

This continuation application claims priority benefit to U.S. patent application Ser. No. 14/422,852 filed Feb. 20, 2015, the entire contents of which is incorporated by reference.

BACKGROUND

The disclosure relates to a piston for an internal combustion engine and a method for producing a piston for an internal combustion engine.

From DD 123 962, it is known that pistons for internal combustion engines consist of at least two parts. These two parts are firstly a ring section that forms the upper land, amongst other things, and includes at least one, or two or more ring grooves, and a base section that, in an intrinsically known way, forms the piston pin bore, the piston bosses, and the piston skirt. These two parts are joined in a suitable shape. The ring element and the base section are shaped in such a manner that a cooling gallery is formed after the two parts are joined. In addition, the piston may, but does not have to, include a combustion bowl.

DE 10 2010 056 220 A1 discloses a welded connection for producing a piston consisting of at least two individual parts. Assembling the parts of the piston in the correct location is extremely complex in this instance because a positioning device is lacking.

DE 10 2007 036 236 A1 discloses an assembled, specifically two-part, piston for an internal combustion engine having a piston upper part and a piston lower part that are joined by means of a thread. However, joining the piston parts by means of a threaded connection is extremely labor-intensive and therefore extremely cost-intensive.

Known joining methods are, for example, press-fitting, soldering, welding, bolting, pinning, or similar. It is essential that a single-piece piston is created from the two individual parts mentioned (ring section and base section) after the two parts are joined, where this single-piece piston gives rise to an operational piston after it is completed in the usual way with rings, pins, pin lock rings and similar.

In the case of the previously known joining methods, the disadvantage is always present that the two components to be joined have to be aligned extremely precisely in order to be able to perform the joining method.

What is needed is to create a piston for an internal combustion engine, in particular a cooling-gallery piston, that can be produced simply; but at the same time with great precision, without the need for costly reworking after the two components have been joined.

SUMMARY

In accordance with the disclosure, provision is made for the two components (ring element and base part, also called the lower part) to center themselves when they are brought together and to form a requisite gap for a joined connection (in particular, a material-to-material joined connection, for example, soldering or welding) as the result of machining.

The present disclosure relates to a piston, in particular a cooling-gallery piston for an internal combustion engine, having a piston lower part and a piston upper part that are joined to form one piston in a joining process, wherein the piston upper part has at least one ring belt and an inner wall, wherein provision is made for the piston lower part to have a radially circumferential oblique surface at the end facing the piston upper part that interacts with the inner wall of the piston upper part to bring about a centering action during the joining process.

In one embodiment aspect, the piston upper part can be designed such that it includes the subsequent ring belt and the subsequent edge zone of the bowl. This piston upper part is designed as a ring with an inverted U-shaped profile having legs of different lengths. The longer, outer leg later forms the ring belt. The subsequent edge zone of the bowl is formed by the shorter, inner leg. The advantage of this is that a suitable material differing from the piston lower part can be used in highly stressed areas.

It is further provided that the piston lower part can have at least one sliding surface that interacts with the inner wall of the piston upper part during the joining process. This at least one sliding surface offers the advantage that low force is to be applied during the joining of the piston lower part and the piston upper part.

It is further provided that in the area of at least one joint seam at least one seat can be provided to create a gap. As the result of the at least one seat, a gap is created with defined dimensions.

It is further provided for the gap adjacent the seat to serve to receive brazing material.

In addition, a repository can be provided to receive soldering material. The gap forms a reservoir for process media in conjunction with the seat. It is advantageous that this reservoir can be filled selectively, for example, before the joining process. After the joining, the process medium, for example, soldering material, is available at the effective location in the correct dosage. After carrying out a soldering process, for example, to join the piston parts, the excess soldering material can be removed along with partial areas of the reservoir.

It is a characteristic of the piston that a circumferential collar is provided on the piston upper part interacting with a seat as a limit during the joining process. Advantageously, the precise, subsequent (height) dimension of the piston is defined by the collar. A "collision" of the piston parts beyond the limit formed by the collar and the seat is possible only if a definable force limit is exceeded. In the joining process the specified force limit cannot be exceeded.

In one aspect, provision is made for the collar to be removed following completion of the joining operation. Any traces of handling on the collar from the joining process are eliminated by removing the collar. The precise dimension of the piston can also be adjusted by removing the collar. The collar acts as an aid in finding the exact position of the piston lower part and the piston upper part with respect to each other in the joining process and se it can be removed after joining.

Furthermore, provision can be made for the piston upper part to form at least one ring belt after the joining procedure. The ring belt serves to receive piston rings in a known manner.

The method for producing a piston, specifically, a cooling-gallery piston for an internal combustion engine, comprises the following steps:

preparing the piston upper part and the piston lower part, and joining the piston parts, wherein provision is made during the joining process that the piston upper part and the piston lower part are centered.

Centering increases process reliability when joining piston upper part and piston lower part to form one piston. As a result of centering, the piston components "find" themselves in the correct position with respect to each other while they are being moved towards each other.

The piston upper part and piston lower part slide on each other into the correct final position to complete the joining process. Centering ensures that the midpoint toward the piston stroke axis of the piston upper part lies above the midpoint toward the piston stroke axis of the piston lower part.

In one aspect of the production method, there is provided that at least one seat for the joining procedure is removed in at least one additional operational step. The seat serves to find a defined position of piston lower part to piston upper part and can therefore be removed after the joining process is completed.

For the sake of completeness it should be mentioned that the two components to be joined may consist of the same material or of different materials. In addition the two components can be produced by the same method or by different methods (e.g. forging, casting or similar).

DETAILED DESCRIPTION OF THE DRAWING

In what follows, aspects of the joined connection of a two-part piston are explained in more detail using the appended Figures in which.

DETAILED DESCRIPTION

Figure 1:
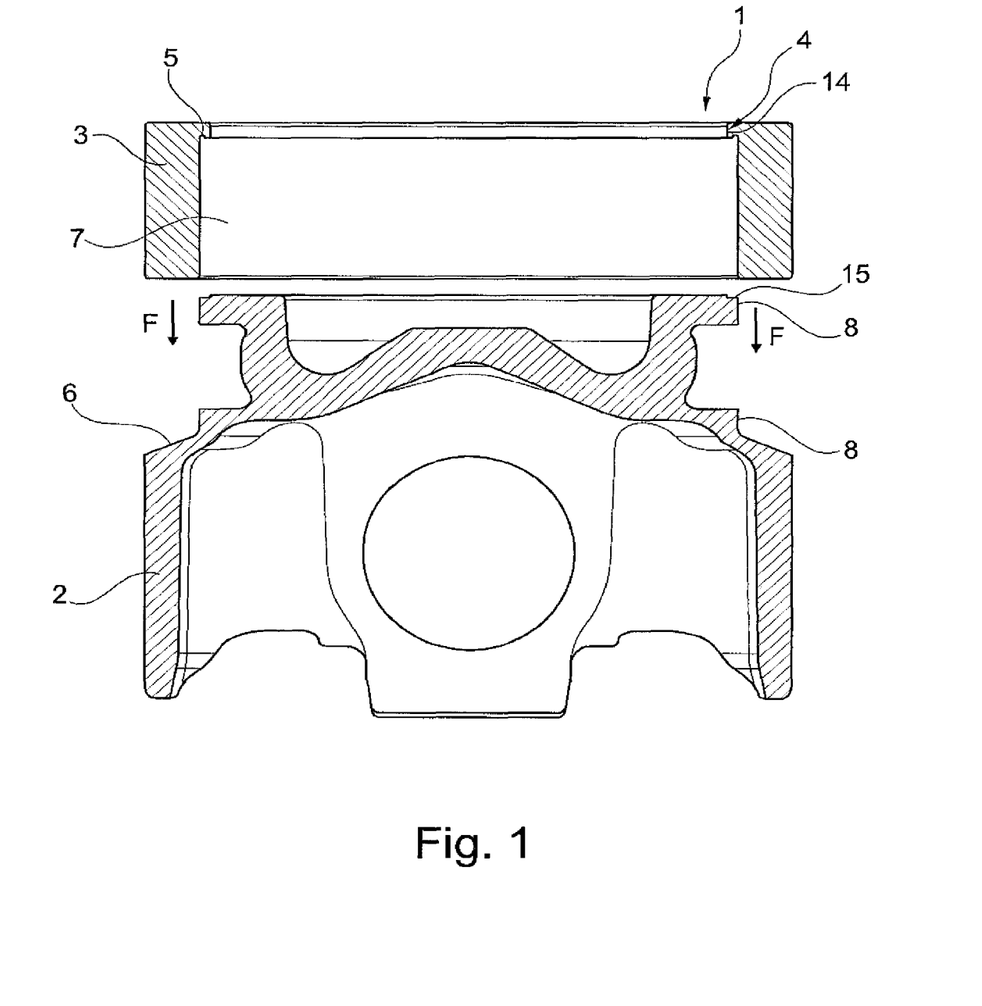
FIG. 1 shows a sectional view of a first aspect of the piston prior to joining.
Figure 2:
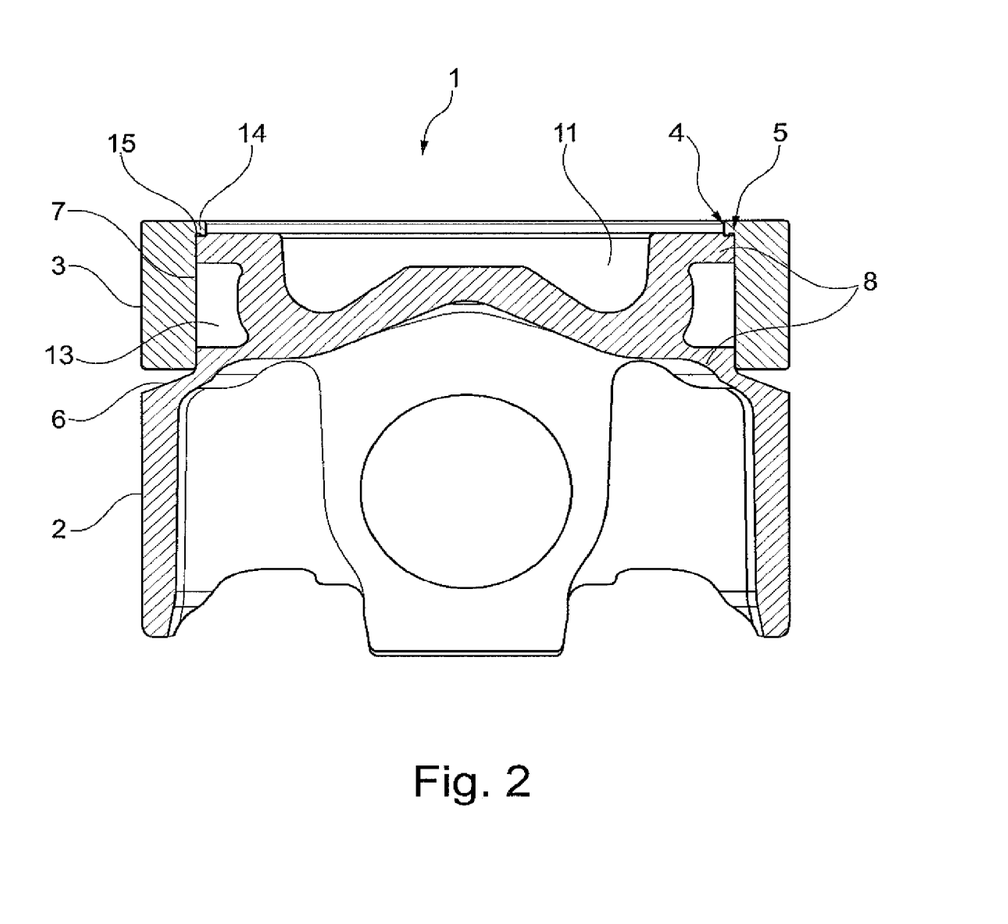
FIG. 2 shows a sectional view of the piston after being joined.
Figure 3:
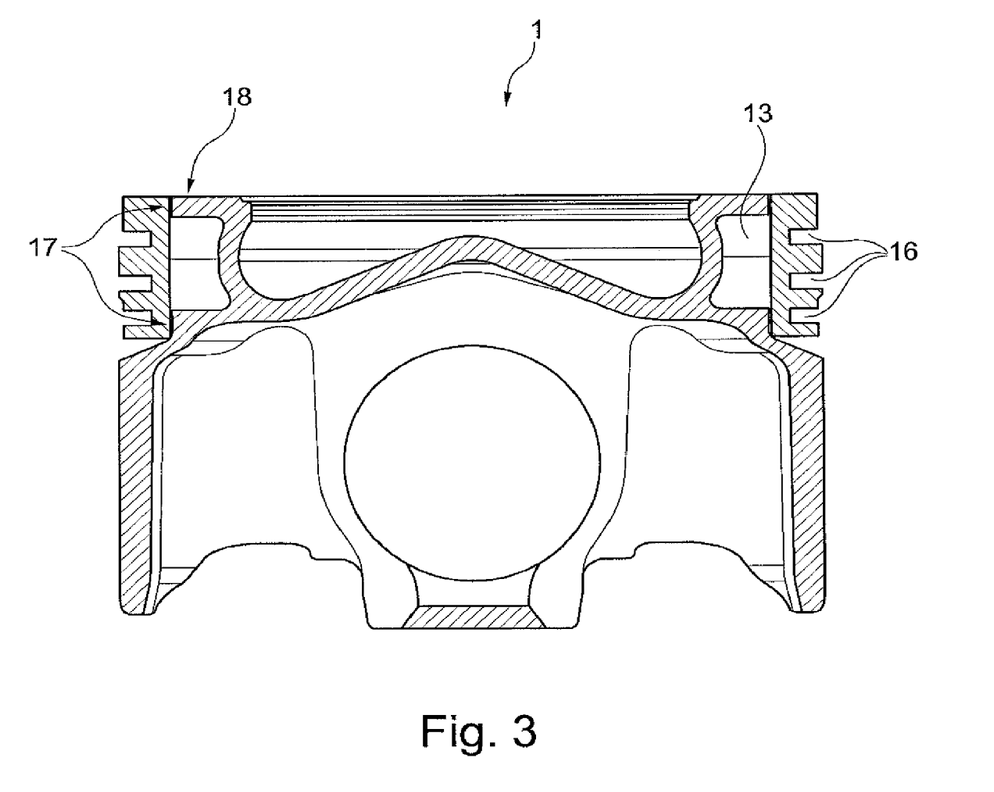
FIG. 3 shows a sectional view of a completed piston.

FIGS. 1 to 3 show a first aspect of a piston 1, and FIGS. 4 to 7 show a further second-aspect of a piston 3. For both aspects, identical reference numerals are used for identical elements.

In the following description of the Figures, terms such as above, below, left, right, in front, behind, etc. refer solely to the selected representative example and position of the device and other elements in the respective Figures. These terms are not to be understood in a restrictive sense, that is to say, these references can change as the result of different positions and/or mirror-image layout or similar.

FIG. 1 shows a piston 1 consisting of a piston lower part 2 and a piston upper part 3 designed as a ring prior to joining. The piston upper part 3 has a seat 4. Additionally the piston upper part 3 may have a repository 5 that can serve to hold soldering paste, for example. In addition, the piston lower part 2 has an oblique surface 6 running radially around the outer circumference. F identifies the direction for joining the piston lower part 2 and the piston upper part 3. When joining the piston lower part 2 and the piston upper part 3, a radially circumferential inner wall 7 of the piston upper part 3 slides past radially circumferential sliding surfaces 8 of the piston lower part 2. In addition, the ring-shaped piston upper part 3 has a collar 14, oriented radially circumferential to the piston center. A radially circumferential stop 15 is located in the upper end area of the piston lower part 2. The joining procedure is complete when the lower area of the inner wall makes contact with the oblique surface 6 and the collar 14 makes contact with the stop 15. The oblique surface 6 assumes the function of a centering device during the joining procedure. Additional materials, such as solder paste, may be, but do not have to be, introduced into the repository 5 prior to the joining procedure. It is also conceivable to include materials or substances in the repository 5 that serve for the later material-to-material connection between the piston lower part 2 and the piston upper part 3.

FIG. 2 shows the later piston 1 after the joining procedure of the piston lower part 2 and the piston upper part 3. It can be clearly seen that the inner wall 7 of the ring-shaped piston upper part 3 has made contact with the radially circumferential oblique surface 6 of the piston lower part 2. Furthermore, the radially circumferential collar 14 of the piston upper part 3 has made contact with the similarly radially circumferential stop 15 of the piston lower part 2. As the result of joining the piston lower part 2 to the piston upper part 3, a radially circumferential open space has formed that can act as a cooling gallery 13. Furthermore, the piston lower part 2 has a bowl 11 in which the combustion process takes place when the internal combustion engine is operating.

FIG. 3 shows the now finished, one-piece piston 1. Joining seams 17 are clearly recognizable that designate the transition zone between the former piston lower part 2 and the piston upper part 3. The piston 1 was machined in one area 18 such that a radially circumferential flat surface was created to the greatest extent possible. To achieve this, the collar 14 and parts of the stop 15 were removed. In addition, a radially circumferential ring belt 16 was introduced in the upper area of the piston 1. A material-to-material joint can be made in the area between the oblique surface 6 of the piston lower part 2 and the piston upper part 3, for example, by welding or soldering. A tight join between the piston upper part 3 and the piston lower part 2 is advantageous in order to prevent the escape of cooling medium from the cooling gallery 13.

Figure 4:
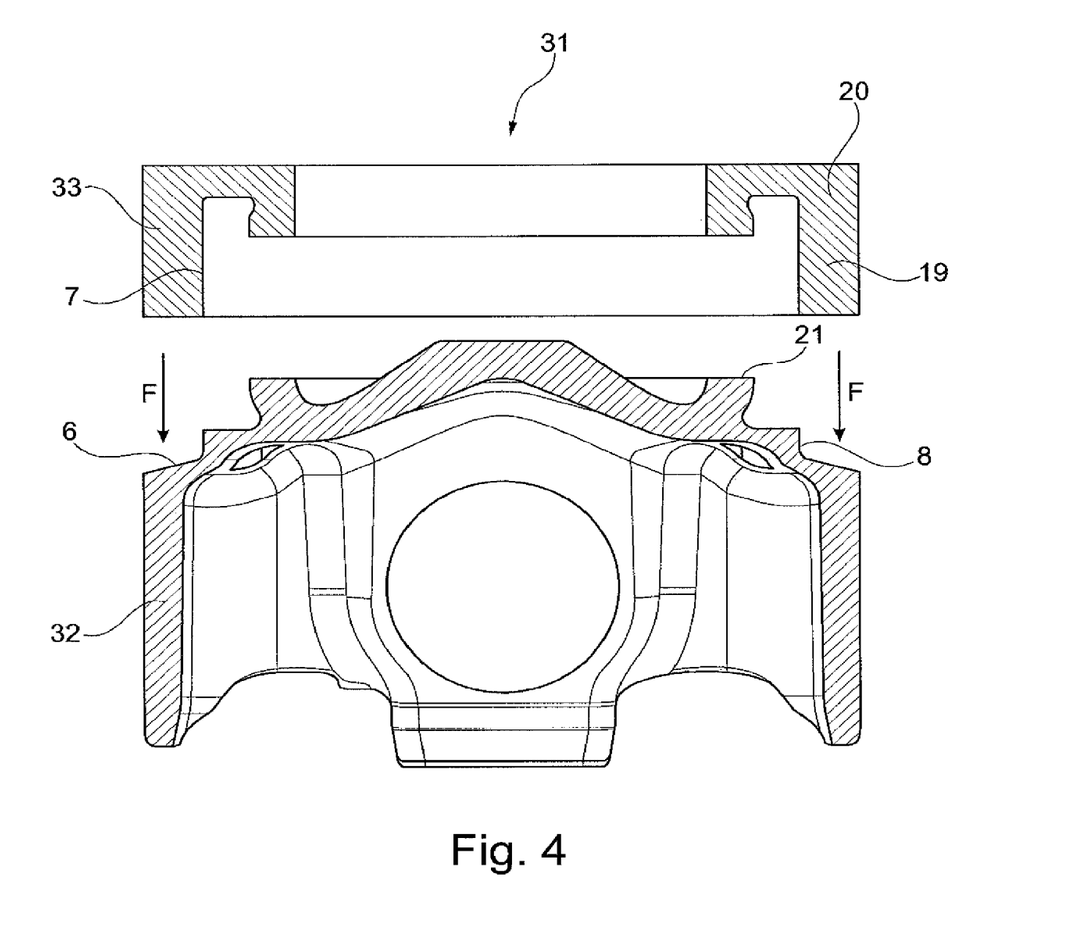
FIG. 4 shows a sectional view of the piston of a second embodiment aspect of the piston.

The second aspect of a piston 31 is described starting with FIG. 4. A piston lower part 32 again has a radially circumferential oblique surface 6. In profile, the ring-shaped piston upper part 33 has the shape of an inverted "U" with legs 19, 20 of unequal length. The longer, outer leg 19 is used to form the ring belt 16 after the joining procedure. The shorter leg 20 is used to form a bowl edge ring 12 after the joining procedure. The piston lower part 32 has a radially circumferential web 21 in the area of a bowl 11 formed after the joining process. In addition, a sliding surface 8 and an oblique surface 6 are formed at the upper outer circumference of the piston lower part 32. When the piston upper part 33 and the piston lower part 32 are joined in the direction F, an inner wall 7 of the piston upper part 33 slides along the sliding surface 8 of the piston lower part 32. The joining process ends when the lower end of the inner wall 7 of the piston upper part 33 comes into contact with the oblique surface 6 of the piston lower part 32. The joining process additionally comes to a stop when the lower end of the short leg 20 of the piston upper part 33 comes into contact with the web 21 of the piston lower part 33.

Figure 5:
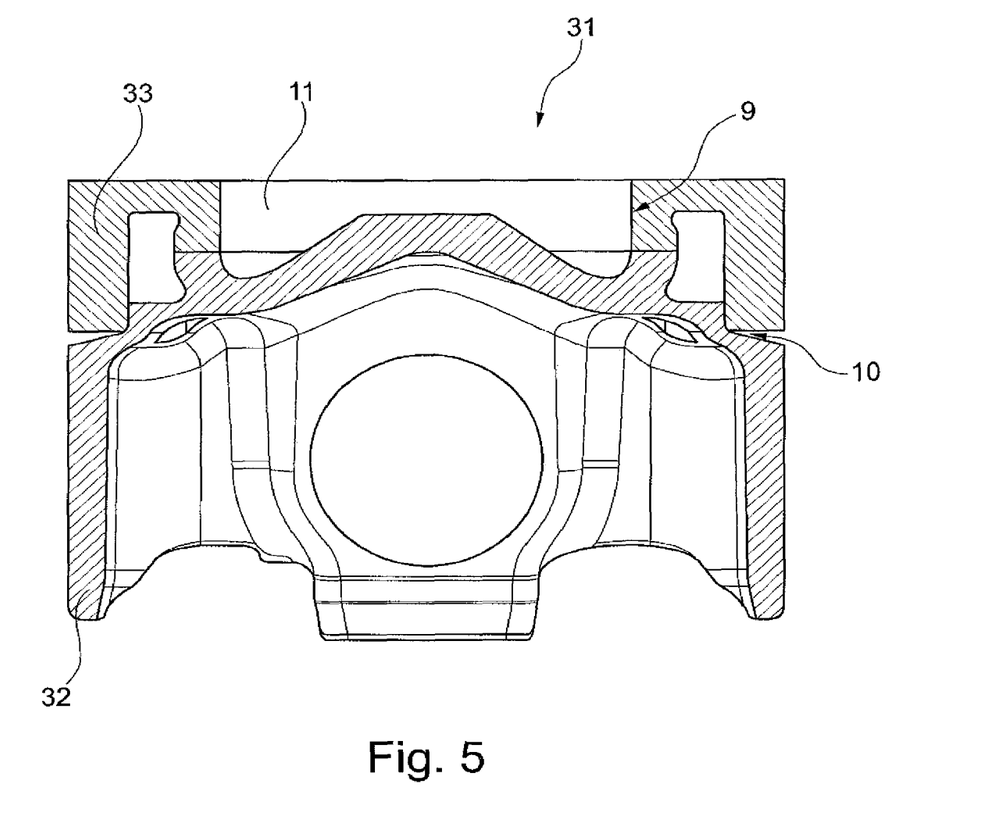
FIG. 5 shows a sectional view of the piston of FIG. 4 after being joined.

FIG. 5 shows the piston 31 after the joining process. An optional contact surface 9 can be provided between the web 21 and the lower end of the leg 20 to form a soldering gap. Centering 10 of the piston upper part 33 and the piston lower part 32, as already described with the first aspect, is carried out through the interaction of the oblique surface 6 with the lower end of the inner wall 7. In the area of the soldering gap, formed by the contact surface 9 and in the area of centering 10, a positive-locking, friction-locking or material-to-material joint between the piston lower part 32 and the piston upper part 33 can be made, for example, a soldered or welded joint can be provided.

Figure 6:
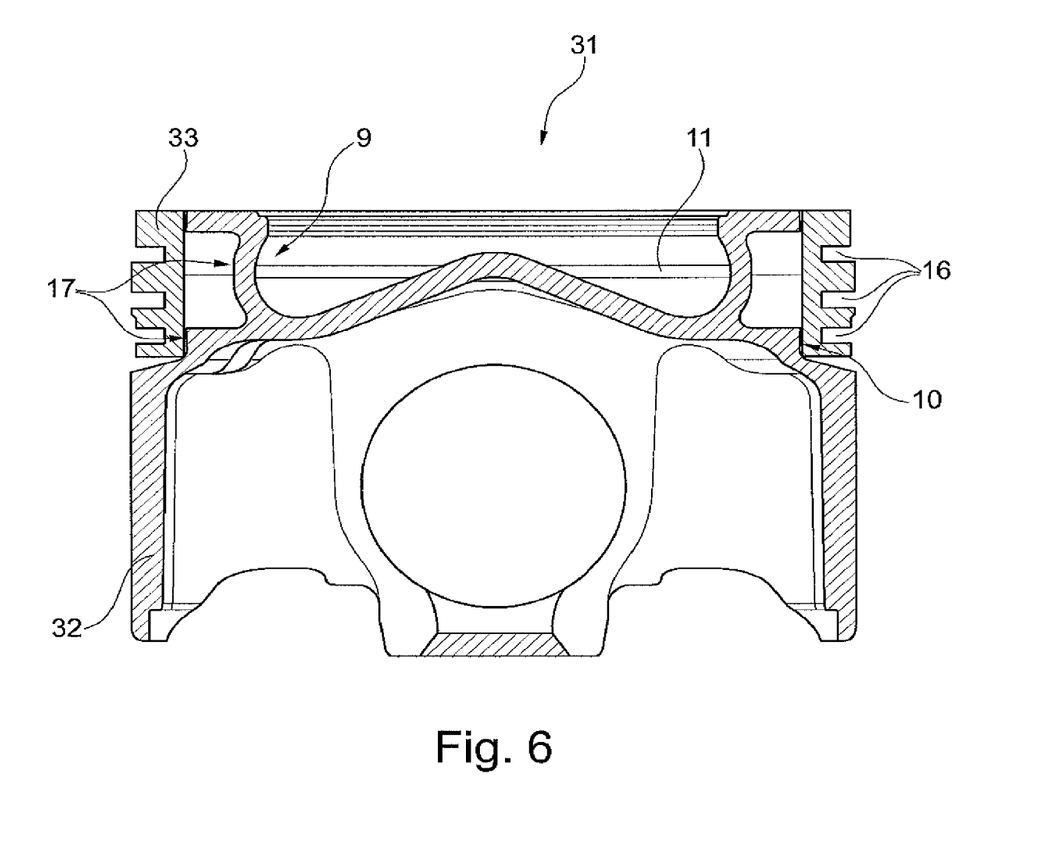
FIG. 6 shows a sectional view of the piston of FIG. 5 prior to the groove being closed.
Figure 7:
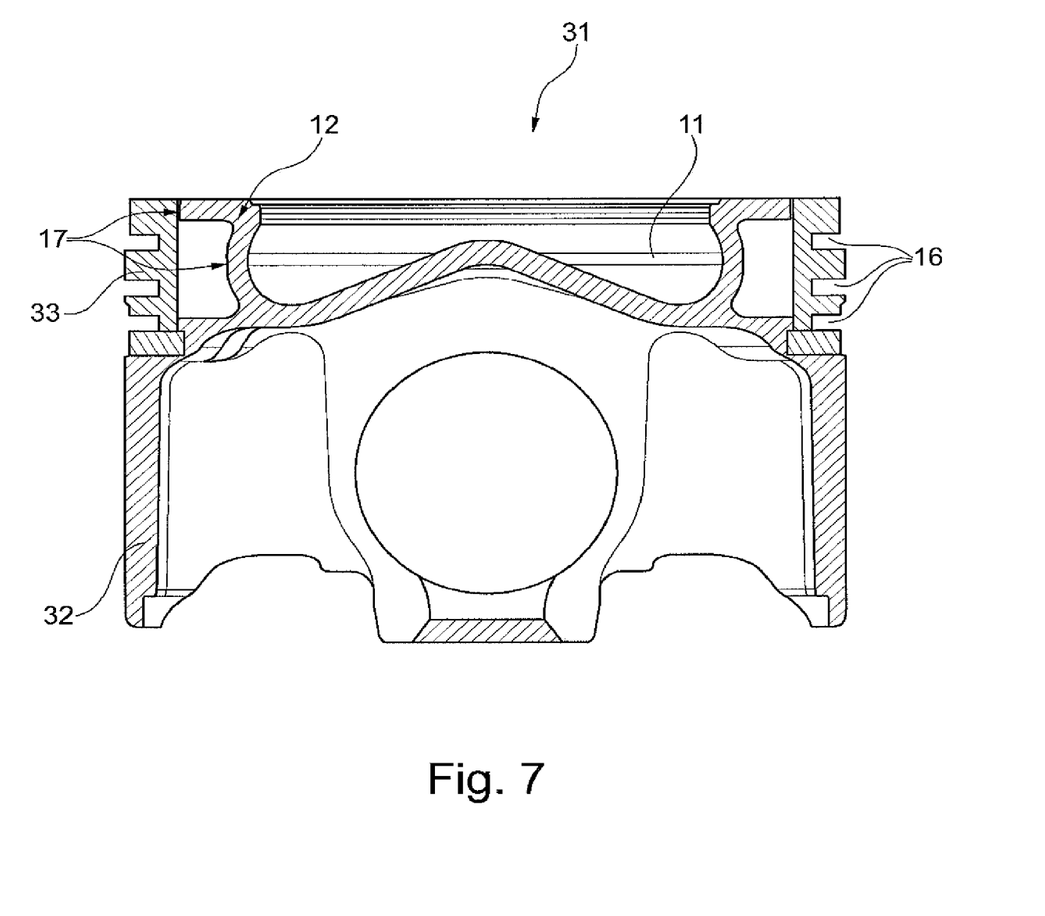
FIG. 7 shows a sectional view of the finished piston shown in FIGS. 4-6.

Following additional machining steps, the completed piston 31 is shown in FIGS. 6 and 7. It can be seen that centering has been maintained after the machining. During the machining of the edge zone of the bowl 11, the contact surface 9 for the solder gap, where it existed, was removed. The joint seams 17 between the piston lower part 32 and the piston upper part 33 are visible. A ring belt 16 was likewise created. The bowl 11 has been given its functional profile.

The joining method for a piston lower part and a piston upper part is not restricted to the aspects described here.

What is claimed:

1. A piston for an internal combustion engine, having a piston lower part and a piston upper part that are connected in a joining process to form the piston, wherein the piston upper part includes at least one ring belt having a lower distal end and an inner wall, the piston comprising the piston lower part having an oblique surface radially increasing relative to the piston stroke axis and extending downward relative to the upper part around an outer circumference of the lower part and facing the piston upper part, wherein on contact of the upper part to the lower part the upper part ring belt lower distal end is positioned axially lower than a cooling gallery relative to the piston stroke axis and engages the oblique surface to center the upper part relative to the lower part about the piston stroke axis.

2. The piston from claim 1, wherein the piston lower part has at least one sliding surface positioned substantially parallel to the piston stroke axis and adjacent the ring belt lower distal end that interacts with the inner wall of the piston upper part to form a joining seam in the joining process.

3. The piston from claim 1, wherein at least one contact surface is provided in an area of at least one joining seam to form a gap.

4. The piston from claim 3, wherein the gap adjacent the contact surface acts to hold soldering material.

5. The piston from claim 1, wherein a repository is provided to receive soldering material.

6. The piston from claim 1, wherein a circumferential collar is provided on the piston upper part as a limit during the joining process interacting with a stop.

7. The piston from claim 1 wherein the lower part further comprises a radially positioned sliding surface parallel to the piston stroke axis, the sliding surface positioned around an outer circumference of the lower part and continuous with the oblique surface, the sliding surface operable to form a joining seam with the upper part inner wall adjacent the ring belt lower distal end.

8. The piston from claim 7 wherein the sliding surface is positioned above the oblique surface toward the piston upper part.

9. A method for producing a piston, for an internal combustion engine, having a piston lower part and a piston upper part that are connected in a joining process to form the piston, wherein the piston upper part has an inner wall, the method comprising:
   forming the piston lower part to include an oblique surface radially increasing relative to a piston stroke axis and extending downward relative to the upper part around an outer circumference of the lower part;
   forming the piston upper part to include a ring belt having a lower distal end and an inner wall;
   installing the piston upper part on the piston lower part along the piston stroke axis;
   engaging the ring belt lower distal end with the oblique surface in an axial position lower than a cooling gallery relative to the piston stroke axis thereby positionally centering the piston upper part relative to the piston lower part; and
   permanently joining the piston upper part to the lower part.

10. The method from claim 9, further comprising forming at least one ring in the ring belt after joining the piston upper part to the lower part.

11. A method for producing a piston, for an internal combustion engine, having a piston lower part and a piston upper part that are connected in a joining process to form the piston, wherein the piston upper part has an inner wall, the method comprising:
   forming the piston lower part to include an oblique surface radially increasing relative to a piston stroke axis and extending downward relative to the upper part around an outer circumference of the lower part;
   forming the piston upper part to include a ring belt having a lower distal end and an inner wall, and a circumferential collar positioned radially adjacent to a central opening defined by the piston upper part prior to installing the piston upper part on the piston lower part;
   forming the lower part to further include a circumferential stop radially aligned with the circumferential collar parallel to the piston stroke axis;
   installing the piston upper part on the piston lower part along the piston stroke axis thereby engaging the circumferential collar with the circumferential stop to prevent further movement of the upper part relative to the lower part along the piston stroke axis;
   engaging the ring belt lower distal end with the oblique surface thereby positionally centering the piston upper part relative to the piston lower part;
   permanently joining the piston upper part to the lower part; and
   removing the circumferential collar after joining the piston upper part to the lower part.

12. The method from claim 11, further comprising:
   removing the circumferential stop after joining the piston upper part to the lower part.

* * * * *